United States Patent [19]
Erdogan et al.

[11] Patent Number: 5,823,859
[45] Date of Patent: Oct. 20, 1998

[54] METHOD OF CONTOURING OPTICAL FIBER END FACES AND APPARATUS USED THEREFOR

[76] Inventors: Cuneyt Erdogan, 25 Magellan Way, Franklin Park, N.J. 08823; Alfred J. Cheswick, 104 Ocean Ave., Loch Arbour, N.J. 07711

[21] Appl. No.: 772,145

[22] Filed: Dec. 18, 1996

[51] Int. Cl.⁶ .................................................. B24B 7/22
[52] U.S. Cl. ............................. 451/65; 451/41; 451/273
[58] Field of Search .............................. 451/57, 293, 279, 451/41, 44, 65, 66, 273

[56] References Cited

U.S. PATENT DOCUMENTS

| | | | |
|---|---|---|---|
| 2,382,257 | 8/1945 | Ramsay | 451/65 |
| 4,567,693 | 2/1986 | Magnuson | 76/82 |
| 4,711,053 | 12/1987 | Snyder | 451/65 |
| 4,766,705 | 8/1988 | Dholakia | 51/328 |
| 4,831,784 | 5/1989 | Takahashi | 51/131.1 |
| 4,839,993 | 6/1989 | Masuko | 51/129 |
| 4,905,415 | 3/1990 | Moulin | 451/279 |
| 4,967,518 | 11/1990 | Moulin | 51/281 |
| 5,185,966 | 2/1993 | Mock, Jr. et al. | 51/283 |
| 5,403,227 | 4/1995 | Franklin et al. | 451/168 |
| 5,480,344 | 1/1996 | Xu et al. | 451/57 |

OTHER PUBLICATIONS

GCT Technologies Data Sheet —Models CT2000, 6000, 9000 1897 Providence Court, Atlanta, GA 30337.
Boehler Corp Data Sheet —Model 69–3000 41 Waukegen Road, Lake Bluff, IL 60044.

*Primary Examiner*—Robert A. Rose

[57] ABSTRACT

An apparatus for polishing the end faces of bare optical fibers or connector terminated fibers so that their shape is either convex or angled. The base structure of the apparatus utilizes several rotating disks upon which deformable pads are mounted. Attached to each pad are polishing films with progressively finer grades of abrasive action. A connector ferrule containing a protruding fiber is mounted in an exchangeable work fixture. Depending upon the selected work fixture, the fiber face is pressed against the coarsest rotating polishing film at a predetermined angle. A carriage linearly traverses the work fixture across the radius of the polishing film resulting in the removal of fiber end face material. Once the circumference of the film is reached the work fixture is repositioned so that radial movement can commence across the adjacent finer grade polishing film.

20 Claims, 9 Drawing Sheets

METHOD OF CONTOURING OPTICAL FIBER END FACES AND APPARATUS USED THEREFOR

FIELD OF THE INVENTION

The present invention generally relates to a method and to devices used for the polishing of optical fibers, and more particularly relates to a polishing device that contours the end face of both fiber optic connectors and bare fibers.

BACKGROUND OF THE INVENTION

Fiber optic cables are presently used as a transmission media for telecommunications, datacommunications, video, cable television, sensing systems, power and telemetry. In order to extend cable span lengths, link various fiber segments together, and access terminal equipment such as transmitters and receivers, fiber optic connectors are utilized. Fiber optic connections are able to be opened and reconnected multiple times providing flexibility for network routing and access.

Fiber optic connectors are terminated on the end of a optical fiber. A typical connector consists of a cylindrical ferrule in which an optical fiber is centered and mounted. The connector also has interlocking hardware for mating with other components. Two terminated male connectors are mated together using a female coupler in such a manner that their respective ferrules are precisely aligned. Male fiber optic connectors are also aligned with active devices such as photodiodes, lasers and LEDs mounted in female receptacles.

High loss optical connections limit the length of fiber systems. Reflections created at the optical connection can travel back towards the light transmitter can disrupt laser modulation resulting in signal distortion. The goal of all connections are low light loss and minimal back reflection.

The primary, factor affecting the loss and reflective characteristics of a fiber optic connector is the quality and contour of the end face of the optical fiber. This surface must be free of scratches and pits for maximum light transmission from fiber to fiber or active device to fiber. The curvature and angle of the fiber end surface relative to the connector's ferrule must be of a magnitude which insures physical contact and minimal back reflectance.

The final step in the termination of a fiber optic connector onto an optical fiber is the polishing of the fiber end face. Originally, this procedure was manually accomplished. A connector was placed in a polishing fixture so that its ferrule was slightly protruding from the fixture base surface. The fixture was then repetitively moved across an abrasive polishing film which removed fiber material until the desired scratch-free surface was attained. This procedure was time consuming and sensitive to the operator's individual "touch".

Machines have been developed to automate the polishing process. While providing obvious advantages over manual polishing, prior art has significant shortcomings regarding various steps in the polishing process.

Prior art often is dependent upon the fiber optic connector's interlocking hardware for mounting onto the polishing work fixture. This limits the usefulness of a single work fixture for multiple connector styles. Connectors in these fixtures are spring loaded to maintain positive contact with the polishing surface. This increases the time required to insert and remove connectors from the work fixtures.

Increased labor costs have necessitated a reduction in the time required to polish a fiber optic connector. The polishing procedure of prior art involves multiple steps including the polishing of connectors on several types of polishing films. Minimizing these steps can greatly save time in the polishing operation.

Fiber optic connectors currently available have pre-radiussed end faces with minimal dome offsets in order to provide a low reflective and low loss connection. The aggressive polishing techniques of prior art can inadvertently resurface the fiber ferrule face eventually compromising performance.

A significant shortcoming of prior art consists of the sweeping arc motions and circular movements on eccentric axis's used to traverse the connector across the polishing surface. This motion does not maximize contact with the polishing film surface area and therefore minimizes this consumable item's longtime usefulness.

Prior art also uses a single polishing surface. Since a typical polishing procedure requires fiber contact with varying grits of polishing films, a machine with a single polishing surface will require the operator to change these films several times during the complete process.

SUMMARY OF THE INVENTION

Therefore, it is an object of the invention to provide an automated means for contouring fiber and terminated fiber connector end surfaces in order to minimize connector loss and reflectance.

An advantage of the present invention is to provide a work fixture that will accept a wide range of connector types regardless of their interlocking hardware style if they use the same diameter fiber ferrule. The mounting of the connector in the work fixture is only dependent upon the ferrule not the connector hardware. Connect between the fiber end face and the polishing surface is maintained by the weight of the work fixture itself and not spring-loaded mechanisms which need to be adjusted.

Still another advantage of the present invention is that it consists of a plurality of polishing surfaces across which the fiber will traverse. This eliminates the need to change polishing films for each progressively lower polishing film grit required in the process.

A further advantage of the present invention is the linear movement of the fiber end face across the radius of the polishing surfaces. This motion results in faster material removal without comprising the inherently designed pre-raduissed and pre-domed offset of fiber optic connector. Linear and radial movement also maximizes the contact area between the fiber end face and the polishing film. This results in using more surface area of the polishing film and extending the useful life of this costly and consumable item.

An additional advantage of the present invention's linear and radial movement is that this motion removes fiber material faster and minimizes the number of polishing film grits required for a complete polishing process.

It is still another advantage that the present invention is small, lightweight and portable for operation on a benchtop or handheld position. Since the unit can be both AC and battery powered, in can be used in numerous environments.

The present invention also has the advantage of polishing fiber end faces in either a convex/domed shape or at a predetermined angle relative to the axis of the fiber ferrule. This surface contouring capability insures low reflectance connector performance.

An advantage of the present invention is the means to easily exchange the work fixtures required to obtain either convex/domed or angled fiber end faces.

It is an advantage of the present invention to create fiber end face movement across the plurality of polishing surfaces using a lead screw. The lead screw provides smooth and highly controllable motion which minimizes vibrations and traversing hesitations which can cause fiber end face defects such as scratches and chip-outs.

Other advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below by way of examples of the invention.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
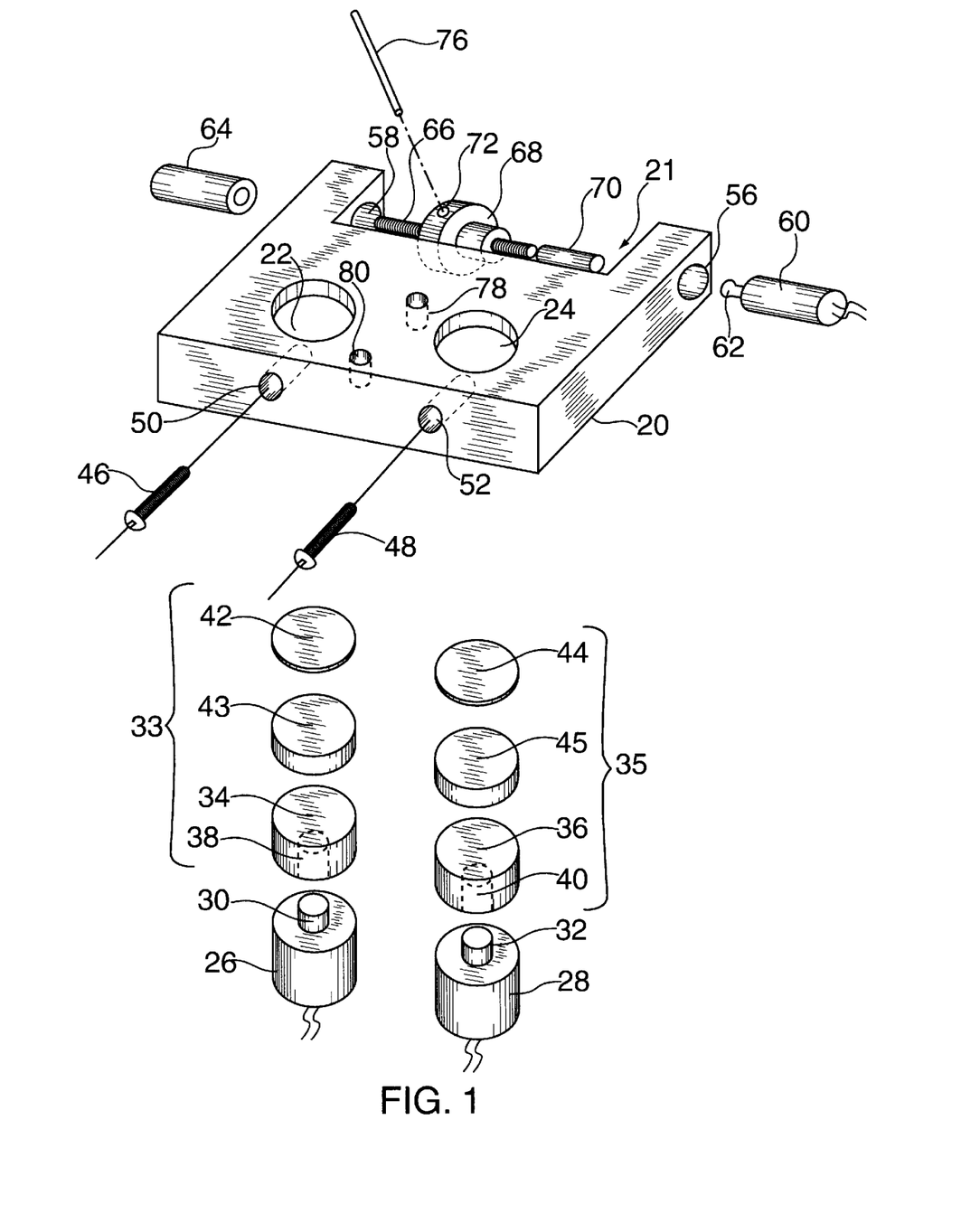
FIG. 1 is an exploded view of a preferred embodiment illustrating the base structure and contouring means.

Referring to FIG. 1, apparatus 1 is provided with a base structure 20. Base structure 20 is provided with two through holes 22 and 24. The inner diameter of through holes 22 and 24 are such that they accommodate the outer diameter of electric motors 26 and 28. Motors 26 and 28 are secured in through holes 22 and 24. This is preferably accomplished with set screws 46 and 48 which make contact with motors 26 and 28 utilizing threaded through holes 50 and 52 in base structure 20. Motors 26 and 28 are energized by conventional power supplies (not shown). Suitable power supplies include DC batteries and AC adapters.

Contouring means 33 and 35 are provided with rotary disks 34 and 36, respectively. Rotary disks 34 and 36 are made of materials such as aluminum, stainless steel, synthetic rubber or polymer plastics such as Delrin. Polymer plastics are preferred. Rotary disks 34 and 36 have diameters of approximately 1 to 12 inches. Rotary disks 34 and 36 have a blind drill bole 38 and 40, respectively. Drill holes 38 and 40 have an inner diameter large enough to permit rotary disks 34 and 36 to be mounted upon motor shafts 30 and 32. Rotary disks 34 and 36 can be mounted to motor shafts 30 and 32 by set screws or press fitting. Press fitting is preferred.

Two contouring surfaces 43 and 45 are bonded to rotary disks 34 and 36, respectively. Suitable bonding techniques are adhesives or surface cohesion. Surface cohesive means is preferred. Suitable materials for contouring surfaces 43 and 45 are materials such as natural and synthetic rubber, glass, polymer plastics and metals. Synthetic rubber is preferred. Polishing films 42 and 44 are bound to rotary disks 34 and 36 by means such as adhesives or liquid cohesion. Liquid cohesion is preferred. Polishing films 42 and 44 have a diameter of approximately the diameter of contouring surfaces 43 and 45. Polishing films 42 and 44 consist of bonded, fine grain polishing media made of substances such as SiC, Al2O3, diamond or the like. A suspended colloidal slurry of these aforementioned polishing media may also be present on the polishing films.

Base structure 20 is provided with a notch 21. Base structure 20 is also provided with two through holes 56 and 58 which exit in the cavity formed by notch 21. Through hole 56 has an inner diameter of sufficient size to accept an electric motor 60. Electric motor 60 is mounted in through hole 56 by means such as epoxy, set screws or press fitting. Press fitting is preferred. Electric motor 60 is energized by a conventional power supply (not shown). Suitable power supplies include DC batteries and AC adapters.

Through hole 58 has an inner diameter sufficient in size to accept a roller bearing 64. A conventional roller bearing, such as the roller bearing described on page 1522 of catalog No. 100 of the McMaster-Carr Supply Company, is preferred. Roller bearing 64 is mounted in through hole 58 by means such as epoxy set screws or press fitting. Press fitting is preferred.

One end of a lead screw 66 is engaged with roller bearing 64 by epoxy, set screws, threading or press fitting. Press fitting is preferred. Lead screw 66 has a size of 0.063 inch to 0.5 inch and a pitch of 5 threads per inch to 300 threads per inch.

A nut assembly 68 is threaded along the axis of lead screw 66. The other end of lead screw 66 is engaged with a motor shaft 62 of electric motor 60 with a coupling means 70. Coupling means 70 is preferably a tubular rubber sleeve. Electric motor shaft 62 and the end of lead screw 66 are engaged with coupling means 70 by press fitting. Other suitable materials for coupling means 70 are rubber, stainless steel, aluminum, brass or copper. Other suitable engagement means between coupling means 70 and lead screw 66 and motor shaft 62 are set screws and locking collars.

Nut assembly 68 has a radial threaded drill hole 72 on surface of its circumference. The inner diameter of drill hole 72 is of sufficient size to accept a coupling pin 76 Coupling pin 76 has a diameter of 0.0313 inch to 0.25 inch and a length of 1 inch to 4 inches. Suitable materials for coupling pin 76 are brass, aluminum or stainless steel. Brass is preferred. Coupling pin 76 is inserted in drill hole 72 to a depth of approximately 0.063 inches to 0.5 inches.

The top surface of base structure 20 is also formed with two threaded drill holes 78 and 80.

Figure 2:
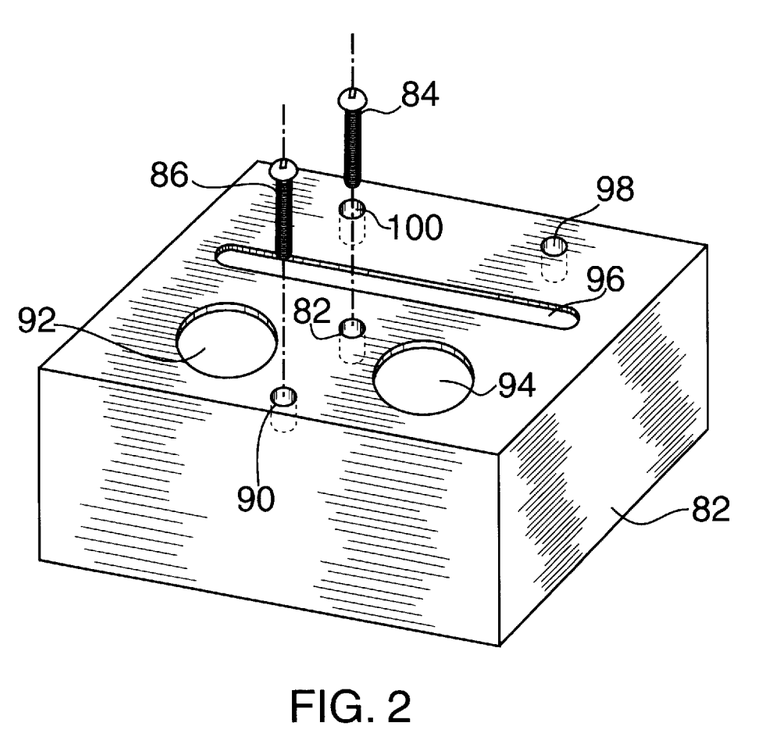
FIG. 2 is an exploded view of the embodiment's frame.

Referring next to FIG. 2, apparatus 1 is provided with a frame 82. Suitable materials apparatus frame 82 are aluminum or polymer plastics such as Delrin. Polymer plastics are preferred. The top surface of frame 82 is formed with two through holes 88 and 90 which are respectively positioned for alignment with threaded drill holes 78 and 80 of base structure 20. Two set screws 84 and 86 secure base structure 20 to frame 83 by means of through holes 88 and 90 and threaded drill holes 78 and 80.

Frame 82 is also formed with two through holes 92 and 94 each having an inner diameter greater than the outer diameter of electric motors 26 and 28. Through holes 92 and 94 are positioned to accept electric motors 26 and 28, respectively.

The top surface of frame 82 is also formed with a elongated cutout 96. The length of cutout 96 is equal to or exceeds the combined diameters of rotary disks 34 and 36. Cutout 96 having a width of approximately 0.125 inch to 2 inch is preferred. Cutout 96 is oriented on the surface of frame 82 to permit coupling pin 76 to protrude above the top surface of frame 82 and to traverse along the longitudinal length of cutout 96 without obstruction. The top surface of frame 82 is also formed with two through holes 98 and 100.

Figure 3:
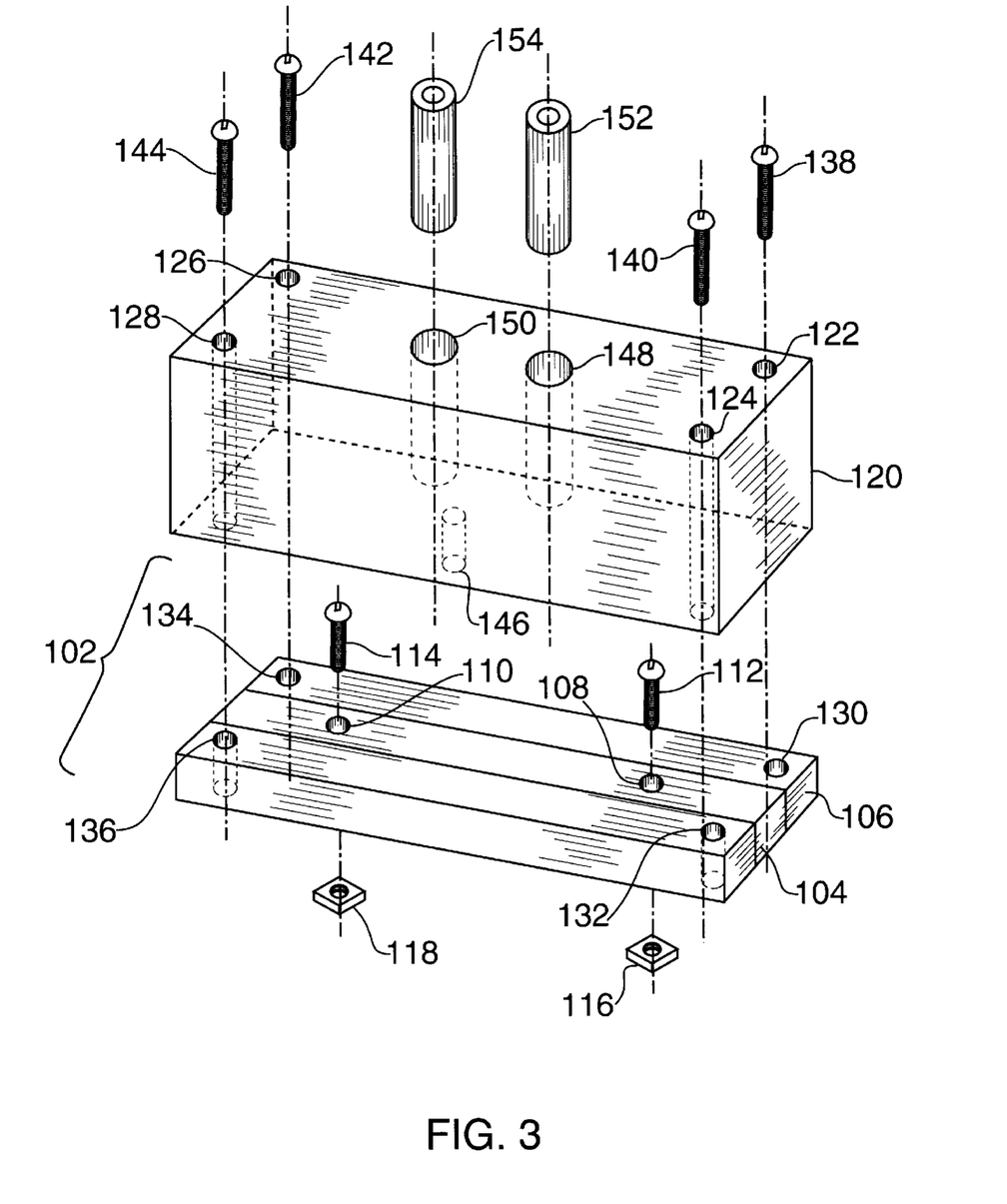
FIG. 3 is an exploded view of the traversing means.

Referring to FIG. 3, apparatus 1 is provided with a linear translation slide 102 disposed on frame 82. Linear translation slide 102 consists of a slide base 104 and sliding member 106. Low friction and linearly translational movement is exhibited between slide base 104 and sliding member 106. Slide base 104 is provided with two through holes 108 and 110. Sliding member 106 is provided with four threaded drill holes 130, 132, 134 and 136. The aforedescribed conventional linear translation slide 102 most suitable for use in the present apparatus is found on page 1540 of catalog No. 100 of the McMaster-Carr Supply Company having a part number of 6203K53.

The through holes 108 and 110 of slide base 104 are aligned with through holes 98 and 100 of frame 82. Slide base 104 is preferably affixed to frame 82 by set screws 112 and 114 and fastened with lock nuts 116 and 118.

Apparatus 1 is also provided with a traversing means 120. Suitable materials for traversing means 120 are aluminum, stainless steel or polymer plastics such as Delrin. Delrin is preferred. Traversing means 120 is formed with four through holes 122, 124, 126 and 128 positioned as to obtain alignment with threaded drill holes 130, 132, 134 and 136 in sliding member 106. Traversing means 120 is preferably affixed to slide member 106 with four screws 138, 140, 142 and 144.

The bottom surface of traversing means 120 is also formed with a drill hole 146 having an inner diameter large enough to accept coupling pin 76. Lead screw nut assembly 68 engages with traversing means 120 by means of coupling pin 76 set in drill hole 146.

The top surface of traversing means 120 is also formed with two holes 148 and 150. Two bushings 152 and 154 having an outer diameter equal to or smaller than the inner diameters of holes 148 and 150 and are secured in drill holes 148 and 150 preferably by press fitting. Other suitable means of securing are epoxy or set screws. Suitable materials for bushings 152 and 154 are bronze, stainless steal, nylon or ceramic. Bronze is preferred.

Figure 4:
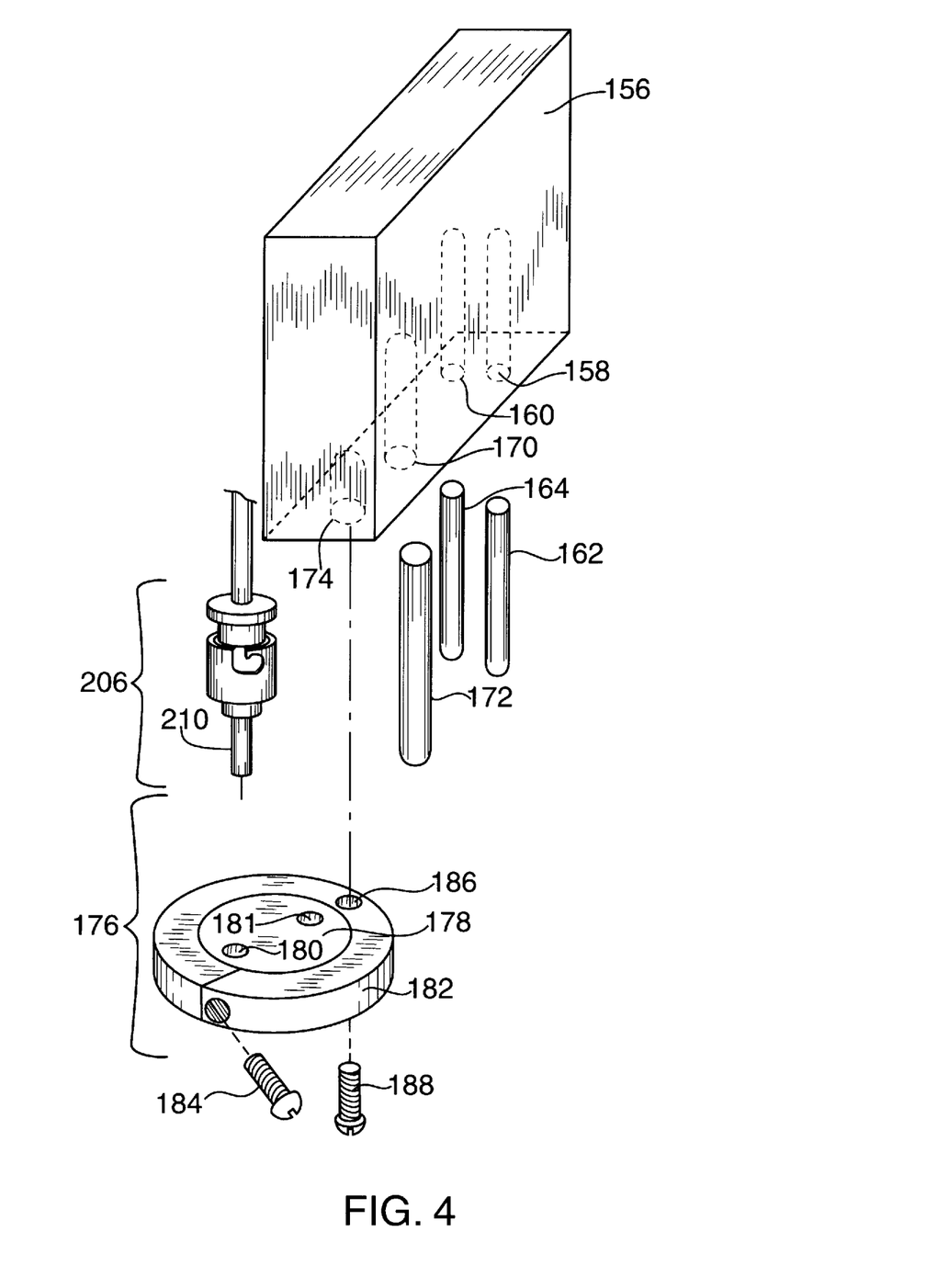
FIG. 4 is an exploded view of the exchangeable positioning means and work fixture means.

Referring to FIG. 4, apparatus 1 is provided with an exchangeable positioning means 156. Suitable materials for positioning means 156 are aluminum, stainless steel and polymer plastics such as Delrin. Delrin is preferred. The bottom surface of positioning means 156 is formed with two drill holes 158 and 160. Two rear guide pins 162 and 164 are preferably press fitted into drill holes 158 and 160, respectively. The length of rear guide pins 162 and 164 arc such that they extend approximately 0.5 inch to 3 inch beyond the bottom surface of positioning means 156. Suitable materials for rear guide pins 162 and 164 are aluminum, stainless steel, brass or copper. Stainless steel is preferred.

The bottom of positioning means 156 is also provided with a drill hole 170. Drill hole 170 is laterally positioned between drill holes 158 and 160 and located at a distance from drill holes 158 and 160 which is greater than the width of traversing means 120. A front guide pin 172 is preferably press fitted into drill hole 170. The length of front guide pin 172 is such that it extends approximately 0.5 inch to 3 inch beyond the bottom surface of positioning means 156. Suitable materials for front guide pin 172 are aluminum, stainless steel, brass or copper. Stainless steel is preferred. Positioning means 156 is also provided with a threaded drill hole 174. Drill hole 174 is positioned 0.25 inch to 5 inch from front guide pin 172.

The apparatus is provided with an exchangeable work fixture means 176 consisting of an insert 178 held by a lock collar 182. Conventional lock collars such as those described on page 1527 of catalog 100 of the McMaster-Carr Supply Company having a part number of 6435K36 are suitable for lock collar 182. Lock collar 182 is closed by means of screw 184. Lock collar 182 is provide with a through hole 186 which is parallel with the center axis of lock collar 182. A screw 188 inserted into through hole 186. Screw 188 secures work fixture means 176 to the bottom surface of positioning means 156 by engaging with threaded drill hole 174.

Suitable materials for insert 178 are nylon, Delran, polymer plastics, Teflon, stainless steel and aluminum. FEP Teflon is preferred. The thickness of insert 178 is equal to or less then the length of a ferrule 210 of a fiber connector 206. Insert 178 is provided with a plurality of through holes 180 and 181. The diameters of through holes 180 and 181 are sufficient to permit a press fit insertion of ferrule 210.

Figure 5:
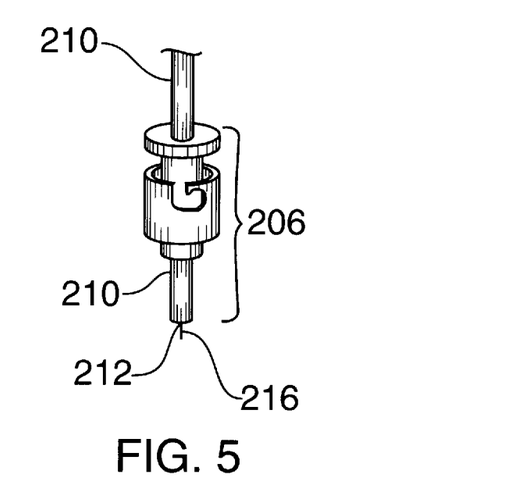
FIG. 5 is a side view of a fiber optic connector assembly with a protruding optical fiber.

The operation of the apparatus 1 will now be described. Referring to FIG. 5, a fiber optic connector assembly 206 is positioned upon an optical cable 21. An optical fiber 216 is either flush with a ferrule surface 212 of fiber ferrule 210 or protrudes above ferrule surface 212 of fiber ferrule 210 by approximately 1 micron to 2000 micron. Optical fiber 216 can either be free floating in connector assembly 206 or affixed in connector assembly 206 via epoxy, adhesive bonding, or crimp.

Figure 6:
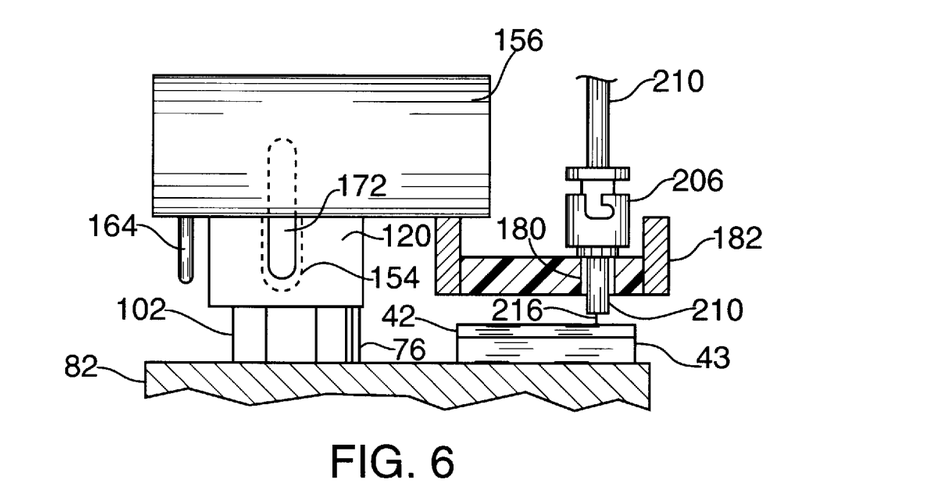
FIG. 6 is a cross sectional view of the embodiment illustrating the engagement of the work fixture with the contouring means due to traversing means.

Referring now to FIG. 6, fiber ferrule 210 of connector assembly 206 is press fit into through hole 180 of insert 178. Positioning means 156 is positioned upon traversing means 120. Alignment is accomplished by inserting front guide pin 172 into bushing 154. Rear guide pins 162 and 164 make sliding contact with the rear surface of traversing means 120 to prevent rotation of positioning means 156.

Figure 7:
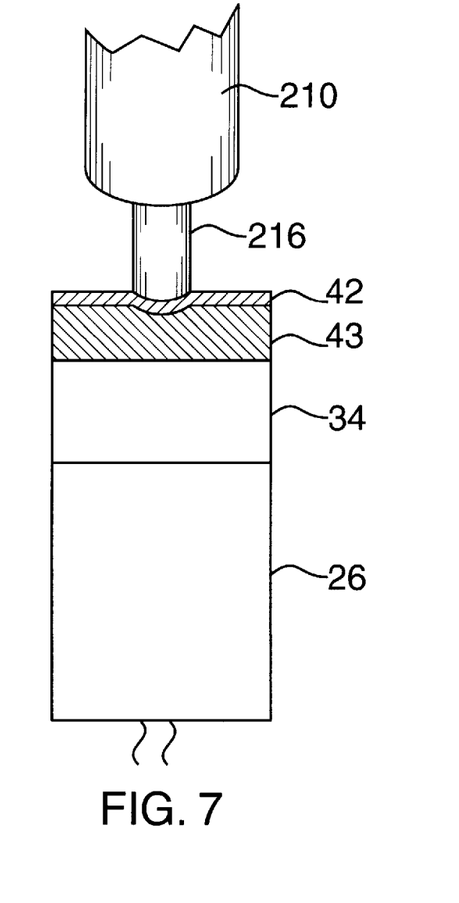
FIG. 7 is a cross sectional view of the embodiment illustrating the deformation of the contouring means by the connector assembly.

Referring now to FIG. 7, during initial commencement of apparatus 1 operation, the front surface of optical fiber 216 makes contact with the center of polishing film 42 which is rotating about its center axis due its engagement which electric motor 26. Upon contact, optical fiber 216 deforms the surface of polishing film 42 and contouring surface 43. Deformation means can be accomplished by at least two forces. In the case of an adhesivelly mounted connector assembly 206, deformation means is the physical weight of positioning means 156. In the case of a free floating fiber 216 within connector assembly 206, an external deformation means such as pressure exhorted by an operator's hand upon the optical cable 210 is preferred. The amount of deformation is determined by the durameter of contouring surface 43. The durameter of contouring surface 43 is preferably of a degree such that as material of optical fiber 216 is removed during the polishing process, its end surface face obtains a convex shape which matches the curvature of the ferrule surface 212.

Figure 8:
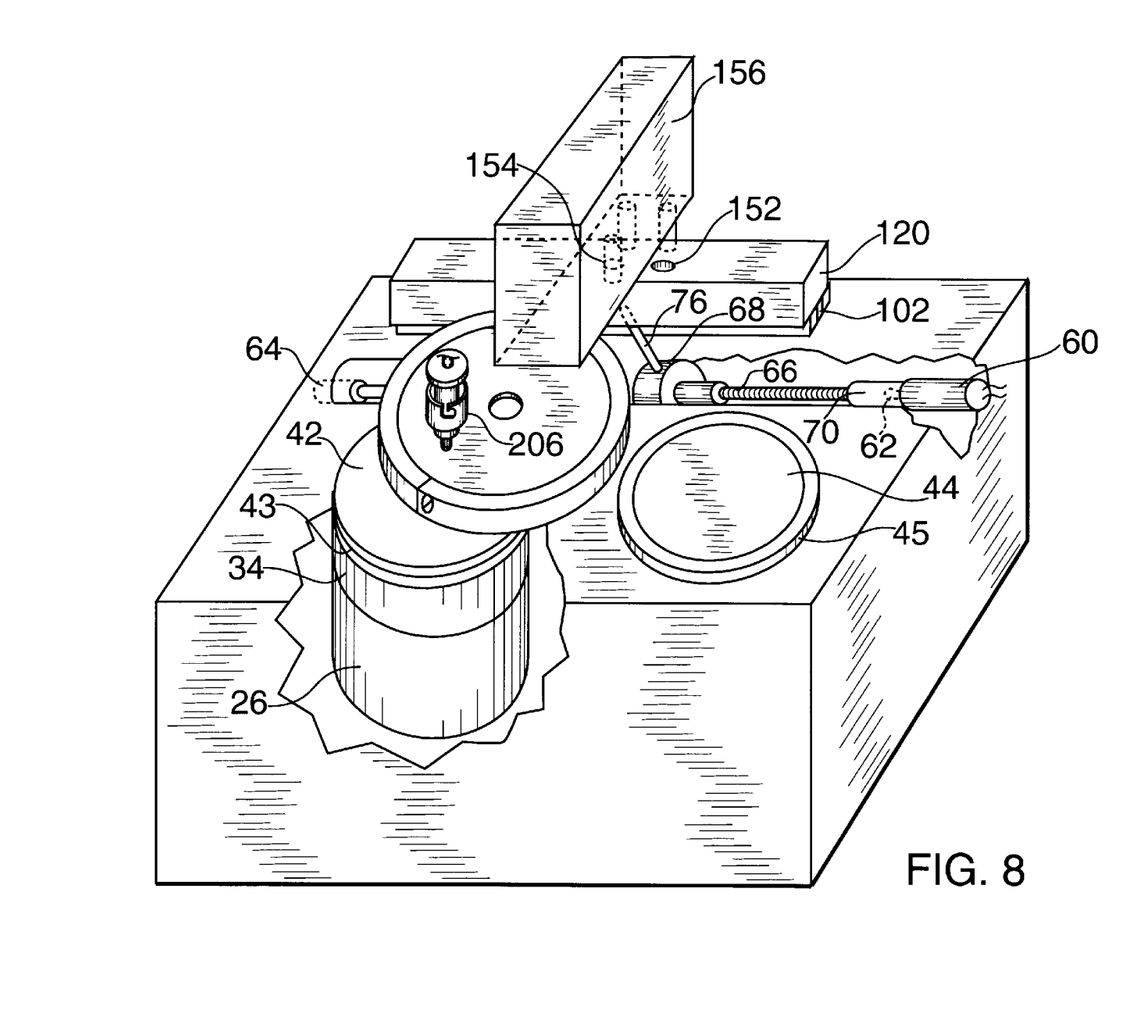
FIG. 8 is an isometric view of the embodiment illustrating the base structure, contouring means, frame, traversing means, and work fixture.

Referring to FIG. 8, traversing means 120 is connected to nut assembly 68 by coupling pin 76. When electric motor 60 is engaged, it rotates lead screw 66 which is terminated in roller bearing 64. This motion causes nut assembly 68 to traverse along lead screw 66 which in turn causes traversing means 120 to move along the length of linear translation slide 102 in the same direction. As traversing means 120 moves along translation slide 102, connector assembly 206 radially travels across polishing film 42 which removes material from the end face of optical fiber 216 in a uniform fashion. This motion across polishing film 42 insures maximum utilization and uniform wearing of the surface area of polishing film 42.

Once connector assembly 206 approaches the circumference of polishing film 42, the operation of electric motor 60 is ceased. Positioning means 156 is removed from bushing 154 of traversing means 120 and front guide pin 172 is now located in bushing 152. This repositioning of positioning means 156 in traversing means 120 aligns connector assembly 206 in the center of polishing film 44. Polishing film 44 has a finer grain size relative to polishing film 42.

Electric motor 60 is once again engaged initiating the linear movement of connector assembly 206 across polishing film 44 which is rotating. As connector assembly 206 moves, the fine grain of polishing film 44 removes any fine scratches, pits and imperfections on the end face of optical fiber 216. When connector assembly 206 reaches the perimeter of polishing film 44 the operation of apparatus 1 is complete.

Figure 9:
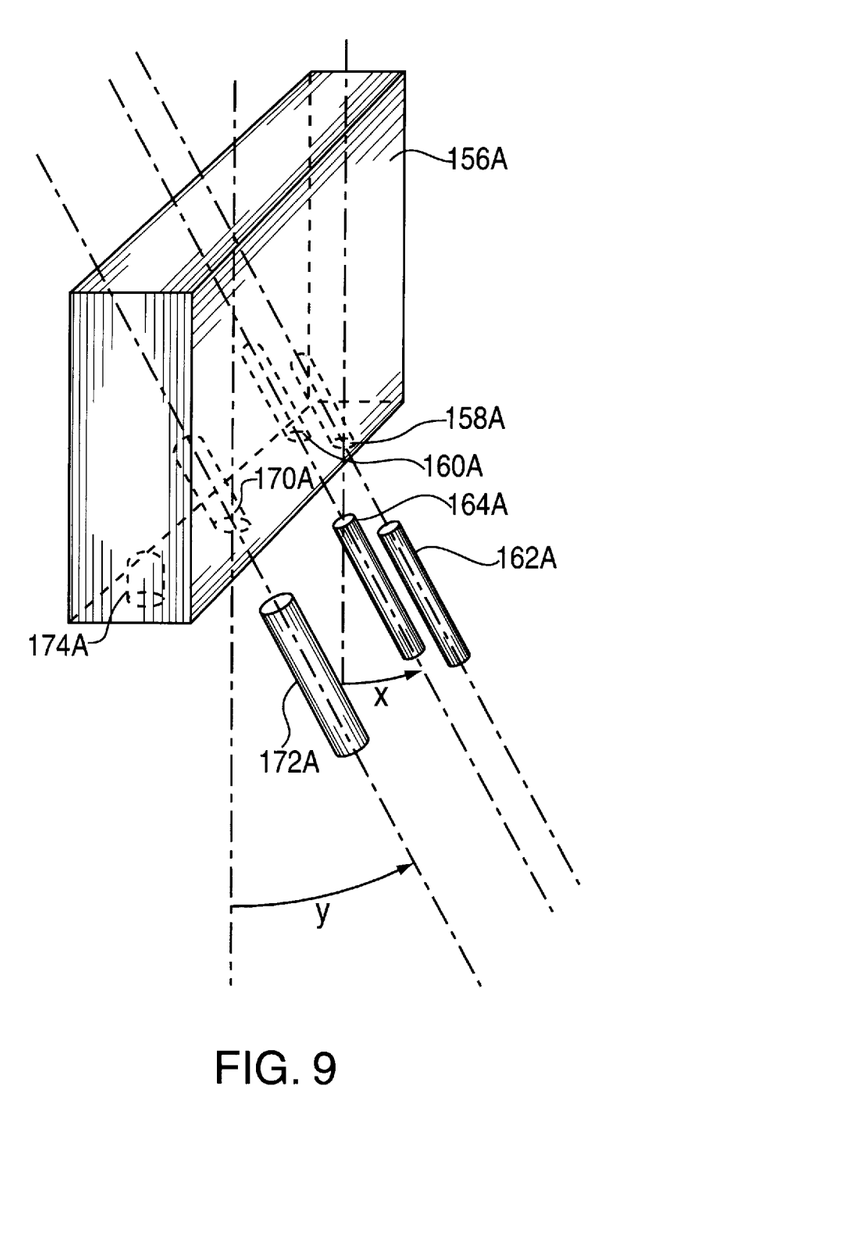
FIG. 9 is an exploded view of another embodiment of positioning means.

In another embodiment of the present invention, apparatus 2 of FIG. 9, is shown having another embodiment of a positioning means 156A. The remaining elements of apparatus 2 are the same as those in apparatus 1 and therefore, such common elements are represented by the same Arabic numerals.

Suitable materials for positioning means 156A are aluminum, stainless steel and polymer plastics such as Delrin. The bottom surface of positioning means 156A is formed with two drill holes 158A and 160A. Drill holes 158A and 160A are formed at an angle x relative to the center axis of positioning means 156A. The degree of this angle x is between 0.5° and 25°, preferably 8°.

Two rear guide pins 162A and 164A are preferably press fitted into drill holes 158A and 160A. The length of rear guide pins 162A and 164A are such that they extend approximately ½ inch to 3 inch beyond the bottom surface of positioning means 156A.

The bottom of positioning means 156A is also provided with a drill hole 170A. Drill hole 170A is laterally positioned between drill holes 158A and 160A and located at a distance from drill holes 158A and 160A greater than the width of traversing means 120 of FIG. 3. Drill hole 170A is formed at an angle x relative to the center axis of positioning means 156A. The degree of this angle x is between 0.5° and 25°, preferably 8°. A front guide pin 172A is preferably press fitted into drill hole 170A. The length of front guide pin 172A is such that extends approximately ½ inch to 3 inch beyond the bottom surface of positioning means 156A.

The bottom of positioning means 156A is also provided with a threaded drill hole 174A. Threaded drill hole 174A is formed parallel with the center axis of positioning means 156A. Threaded drill hole 174A is of a diameter that will accept set screw 188 which secures work fixture means 176 of FIG. 4 to the bottom of positioning means 156A.

Figure 10:
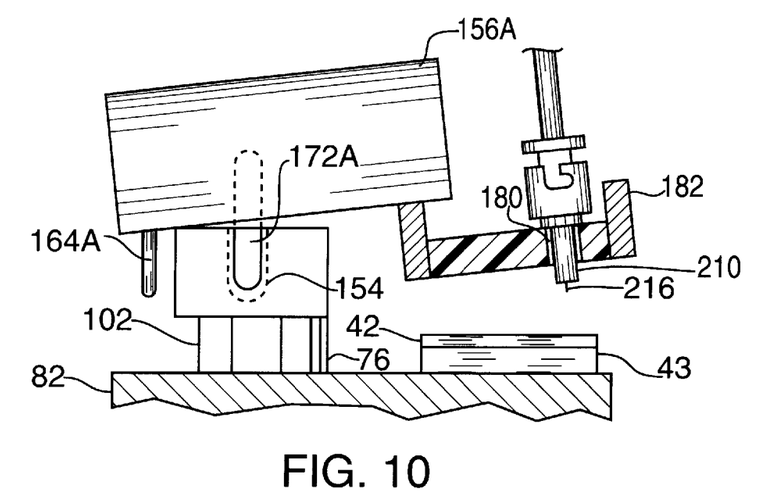
FIG. 10 is a cross sectional view of the embodiment of FIG. 9 illustrating the engagement of the work fixture with the contouring means due to traversing means.

Referring now to FIG. 10, the operation of apparatus 2 will be described. Fiber ferrule 210 of connector assembly 206 is press fit into through hole 180 of insert 178. Positioning means 156A is positioned upon traversing means 120. Alignment means are accomplished by inserting front guide pin 172A into bushing 154. Rear guide pins 162A and 164A make contact with the rear surface of traversing means 120 to prevent rotation of positioning means 156A.

During initial commencement of apparatus 2 operation, optical fiber 216 which is protruding from ferrule end face 212, makes contact with the center of polishing film 42 which is rotating about its center axis due its engagement which electric motor 26. Optical fiber 216 makes contact with the surface of polishing film 42 at an angle equal to the previously described angle x formed between drill hole 170A and the center axis of positioning means 156A, as illustrated in FIG. 11.

Figure 11:
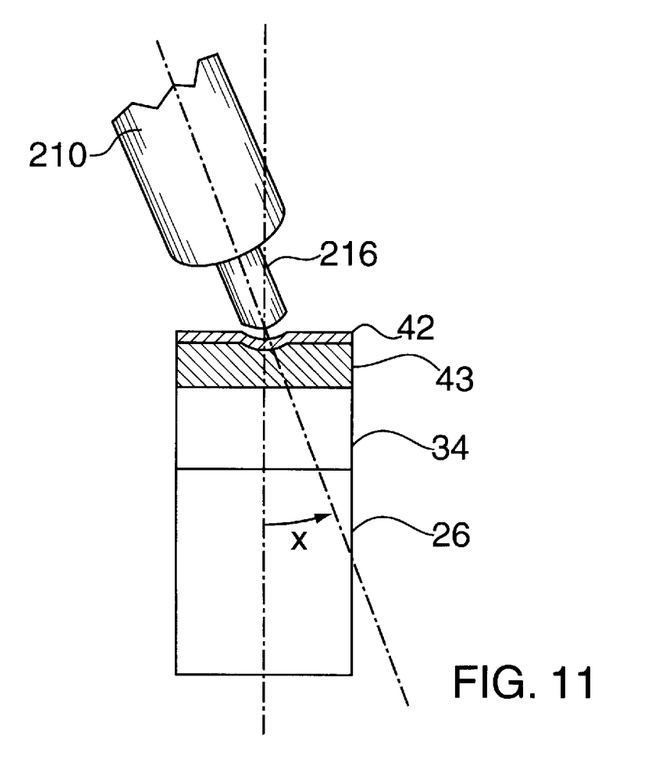
FIG. 11 is a cross sectional view of the embodiment of FIG. 9 illustrating the deformation of the contouring means by the connector assembly.

Upon contact, optical fiber 216 deforms the surface of polishing film 42 and contouring surface 43 as displayed in FIG. 11. Deformation means can be accomplished by at least two forces. In the case of an adhesivelly mounted connector assembly 206, deformation means is the physical weight of positioning means 156A. In the case of a free floating fiber 216 within connector assembly 206, an external deformation means such as pressure exhorted by an operator's hand upon the optical cable 210 is preferred. The amount of deformation is determined by the durameter of contouring surface 43. As material of optical fiber 216 is removed during the polishing process, the plane in which the end surface of optical fiber 216 lies is at an angle relative to the center axis of ferrule 210 equal to the previously described angle formed between drill hole 170A and the center axis of positioning means 156A.

We claim:

1. An apparatus for contouring the surfaces of optical fibers comprising:
    a base structure;
    a plurality of contouring means rotatably disposed on said base structure;
    a work fixture means for mounting thereon a plurality of optical components containing said optical fibers;
    a traversing means disposed on said base structure creating linear movement of said work fixture across said plurality of contouring means;
    an exchangeable positioning means comprised of a plurality of guide pins, disposed on said work fixture, said positioning means creating contact between said optical fibers and said contouring means at a predetermined angle.

2. The apparatus of claim 1 wherein said plurality of guide pins exchangeably engage with said traversing means.

3. The apparatus of claim 2 wherein said guide pins are oriented to enable said predetermined angle between said optical fiber and said contouring means.

4. The apparatus of claim 1 wherein said contouring means comprise a plurality of rotary contouring disks disposed on said base structure.

5. The apparatus of claim 4 wherein said plurality of rotary contouring disks have varying hardness from that of stainless steel to synthetic rubber.

6. The apparatus of claim 5 wherein a plurality of polishing media are disposed upon said rotary contouring disks.

7. The apparatus of claim 1 wherein said work fixture is removable from said positioning means.

8. The apparatus of claim 1 wherein said linear movement is at a constant rate relative to said base structure and radially traversing said plurality of rotating contouring means through the center of said plurality of rotating contouring means.

9. The apparatus of claim 1 wherein said traversing means is engaged with a rotating lead screw.

10. The apparatus of claim 9 wherein said traversing means is mounted on a linear translation slide.

11. The apparatus of claim 1 wherein said contact between said optical fibers and said contouring means result in a surface deformation of said contouring means.

12. The apparatus of claim 1 wherein optical components are cylindrical ferrules.

13. The apparatus of claim 1 wherein contouring means are rotated by an energizing means.

14. The apparatus of claim 1 wherein traversing means creates said linear movement by an energizing means.

15. An apparatus for the shaping and polishing of the end surface of optical fibers comprising:

a base structure;

a work fixture means capable of securing a plurality of optical components in contact with a plurality of contouring means;

an exchangeable positioning means comprised of a plurality of guide pins;

a traversing means which moves said surface of said optical fibers across said plurality of contouring means in a linear motion.

16. The apparatus of claim 15 wherein said plurality of guide pins enable the engagement between said positioning means and said traversing means.

17. The apparatus of claim 16 wherein said plurality of guide pins are oriented to enable engagement between said positioning means and said traversing means at a predetermined angle.

18. The apparatus of claim 15 wherein said exchangeable positioning means can be removed and relocated on said traversing means obtaining contact with said optical fiber and said plurality of contouring means.

19. The apparatus of claim 15 wherein said contouring means comprise rotating disk assemblies.

20. The apparatus of claim 15 wherein said traversing means provides linear movement of said optical fiber across the center of said contouring means.

* * * * *